United States Patent
Andrews et al.

[15] 3,697,528
[45] Oct. 10, 1972

[54] RADIATION SENSITIVE MATERIALS CONTAINING BIPYRIDILIUM SALT OF A STRONG ACID

[72] Inventors: Timothy Douglas Andrews; Glyn David Short, both of Northwich; Ieuan Thomas, Frodsham, all of England

[73] Assignee: Imperial Chemical Industries Limited, London, England

[22] Filed: May 26, 1970

[21] Appl. No.: 40,714

[30] Foreign Application Priority Data

May 28, 1969 Great Britain..........26,925/69
Sept. 12, 1969 Great Britain..........45,751/69
Nov. 24, 1969 Great Britain..........57,392/69

[52] U.S. Cl............260/294.9, 260/2 R, 260/29.2 N, 260/47 R, 260/78.4 N, 260/80 R, 260/249.6, 260/269, 260/288, 260/294.8 R, 260/296 D, 260/240 E, 96/90, 96/115 R, 117/161 UN, 204/159.11

[51] Int. Cl................................................C07d 31/46
[58] Field of Search...................260/294.9, 294.8 R

[56] References Cited

UNITED STATES PATENTS 3,622,477 11/1971 Colchester.............260/296 D

Primary Examiner—Alan L. Rotman
Attorney—Cushman, Darby & Cushman

[57] ABSTRACT

A radiation sensitive material based on nitrogeneous dications such as bipyridyls, preferably with a water soluble polymer as a support. Sensitisers and desensitisers are described. The materials are sensitive to X-rays, electrons and UV up to about 500 nm, in the presence of sensitisers.

2 Claims, No Drawings

RADIATION SENSITIVE MATERIALS CONTAINING BIPYRIDILIUM SALT OF A STRONG ACID

This invention relates to radiation sensitive materials.

According to this invention we provide a radiation sensitive material in which a support carries a salt in which the cationic units contain nitrogen atoms at least one of which is quaternized, said nitrogen atoms being contained in linked, at least partially aromatic rings. The term "units" is used to indicate cations which may be simple cations or may be contained in more complex molecules including polymers.

Preferably the link between the rings provides a chain of conjugated unsaturation between the nitrogen atoms.

Especially preferred salts for use as radiation sensitive components are salts of the following general formula:

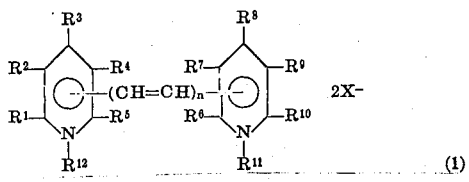

(1)

where $R^{1-12}$ are hydrogen, halogen or organic substituents including groups between units having the structure 1, which form polymeric salts.

$n = 0$ or an integer $X^-$ is an anion derived from a strong acid (pKa preferably $<2.5$)

Usually the link joins the two aromatic rings in the 4,4' or 2,2' positions, when it replaces $R^{3,8}$ or $R^{5,6}$, e.g. 2,2'-bipyridyls and 4,4'-bipyridyls.

Pairs of substituents on the same or adjacent rings may be links to form cyclic structures. For example, in radiation sensitive components containing a 4,4'-bipyridyl structure (2).

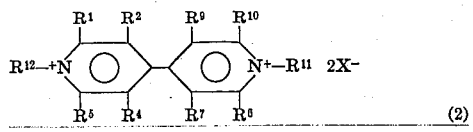

(2)

pairs of groups R may be linked to form a single divalent unsaturated organic group, particularly the pairs $R^{1,2}$, $R^{4,5}$, $R^{9,10}$, $R^{6,7}$, $R^{2,9}$ and $R^{4,7}$. In the first four of these cases, the divalent organic group may form a fused aromatic ring as in biquinolinium compounds. When $R^{2,9}$ and $R^{4,7}$ are both joined by ethylenic groupings, a diazapyrineum nucleus is formed.

The salt which confers radiation sensitivity may contain a simple cation, especially a dication or it may be part of a more complex molecule, as in dimeric cationic compounds. It may also be polymeric, in which the cationic unit may be contained in the polymer backbone, in end groups or in side chains or in combinations of such positions.

The salts containing dications which are described generally above and which will be described in greater detail with examples later, have the common feature of being reducible to a radical cation of different light absorption characteristics from the original cation on exposure to radiation. Salts containing mono cations are reduced to neutral radicals.

For practical purposes the salt is selected such that the cation unit is not intensely visibly colored, preferably nearly or completely colorless. It should, however, have a high extinction coefficient over the range of wavelengths to which sensitivity is required.

In contrast, the radical formed from the cation on irradiation should have a high extinction coefficient in the visible region of the spectrum.

The support for the radiation sensitive component will usually be a laminar material to which the salt is applied, for example by impregnation or by coating. Certain salts which will be described are film-forming materials in their own right and may be used as such, though these too may be applied to a substrate. Most salts to be described need to be associated with a film-forming material for application to a substrate. Since the salts are mostly water soluble it is usual to use them in admixture with a water soluble film forming material, usually a polymer. This technique is equally applicable to salts which are film-forming without of necessity using additional film-forming materials. Water-based film-forming polymers are generally desirable as they assist in stabilizing the radicals when they are formed.

Films or coatings may be prepared on a suitable substrate such as paper, sheet materials or glass. These products are useful for information recording and storage, for example photography, micro-filming, printing and high energy radiation and particle detection. Since the irradiated film is strongly colored the exposed materials are useful as optical filter elements. For many uses our materials have advantages over conventional silver containing photographic emulsions in that the images produced are substantially grain-free, so higher resolution is attainable. This high resolution is of considerable advantage in electron microscopy, photographic recording and systems utilizing electron beams for recording information.

The range of wavelength of radiation to which our composite material responds, the color of the image recorded and the sensitivity of the material depend upon the precise nature of the polymeric substrate, the cation and associated anions and the presence or absence of other additives such as dyes, pigments and sensitizers.

Radiation sensitive materials according to our invention respond mainly to radiation of wavelength shorter than about 400 nm, though with added sensitizers, the range may be extended up to about 550 nm. The materials are responsive to ultraviolet radiation, to X-rays and electron beams.

Various essential and optional components of the radiation sensitive materials will now be described in greater detail under the following headings:

A. Dicationic compounds
B. Anions
C. Film forming polymers
D. Additives
   (1) for speed improvement
   (2) sensitizers and desensitisers
   (3) miscellaneous
E. Film properties
F. Specific examples A. Dicationic Compounds The general principles for selecting the dicationic compounds have already been described.

Examples of suitable salts are compounds containing the following active units.

| Formula | Name |
|---|---|
| −⁺N⌬−⌬N⁺− | 4,4′-bipyridylium (P). |
| −⁺N⌬⌬−⌬⌬N⁺− | 4,4′-biquinolinium (Q). |
| −⁺N⌬−CH=CH−⌬N⁺− | 1,2-bis(4-pyridyl) ethylene (E). |
| −⁺N⌬⌬⌬N⁺− | 2,7-diazapyrinium (A). |
| ⌬⌬ N⁺ N⁺ | 2,2′-bipyridyl (B). |
| N⌬−⌬N⁺− | 4-(4′-pyridyl) pridyinium (M). |

The reference letter following each name will be used in the following description to indicate the appropriate cationic unit to avoid repeating the whole structural formula. Thus $CH_3 - P - CH_3 \cdot 2Cl^-$ represents N,N′-dimethyl-4,4′-bipyridylium chloride. It is implicit in this nomenclature that the $CH_3$ groups are linked to the nitrogen. It is to be understood however that substitution on the carbon atoms of the nuclear unit is possible. Such substituents include alkyl, aryl, aralkyl, alkaryl and oxyhydrocarbyl groups. Of the halogens, chlorine and fluorine may be present, but iodine and bromine are less desirable because they act as quenchers for the excited state of the dication. Fluorescent groups should preferably be avoided, e.g. p-methoxyphenyl groups. It is also desirable that readily reducible groups are absent, e.g. $NO_2$. Therefore when using the symbol P, D, Q etc., it will be clear that as well as the parent compound, suitably substituted derivatives may also be used, e.g. 2,2′-dimethyl-4,4′-bipyridilium compounds.

Confirmation that the dicationic compound is radiation sensitive may be obtained by dissolving 1 percent by weight of the dicationic compound in a 10 percent by weight aqueous polyvinyl alcohol solution and then casting a film from this mixture. Exposure of the dried film to ultraviolet radiation of wavelength in the range 200–400 nm causes a coloration which may be blue, green, blue-green, purple or red. Using a test of this type, the following compounds have been found to be radiation sensitive.

$$R-P-R2X^-$$

where R is (1) $-CH_3$, X=Cl, Br, $SiF_6$, $HSO_4-$, $CH_3SO_4-$
(2) $-CH_2-CH_2-⌬N$, X=Cl
(3) $-CH_2CH_2-⌬^N$, X=Cl
(4) $-⌬$, X=Cl, with $OCH_3$
(5) $-CH_2CO-⌬$, X=Cl, with $CH_3$, $CH_3$
(6) $-CH_2-⌬^N$, X=Cl
(7) $-⌬N$, X=Cl
(8) $-CH_2CON(C_2H_5)_2$, X=Cl
(9) $-CH_2-⌬$, X=Cl
(10) $-CH_2CONH-⌬$, X=Cl
(11) $-CH_2CONH-t\text{-but.}$, X=Cl
(12) $-(CH_2)COCH_3$, X=Br
(13) $-CH_2CH_2OH$, X=Cl
(14) $-(CH_2)_nCON\begin{array}{c}i\text{-prop}\\i\text{-prop}\end{array}$, X=Cl
(15) $-CH_2CONH-⌬-OCH_3$, X=Cl
(16) $CH_3COOC_2H_5$, X=Br
(17) $-⌬-CN$, X=Cl
(18) $-⌬-OCH_3$, X=Cl
(19) $-⌬-Cl$, X=Cl
(20) $-⌬-OC_2H_5$, X=Cl
(21) $-⌬$, X=Cl Note.—t-but=Tertiary butyl; i-prop=Isopropyl.
The groups R may be different as in—

(22) 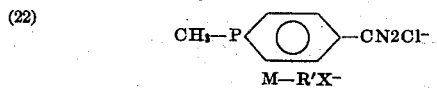
$$CH_3-P⌬-CN2Cl^-$$

$$M-R'X^-$$

where R' is

(23) $-⌬-NHCOCH$, X=Cl
(24) $-⌬-OC_2H_5$, X=Cl
(25) $-CH_3$, X=Cl

Other compounds which have been tested are

(26) $CH_3-O-CH_3(CH_3SO_4^-)_2$
(27) 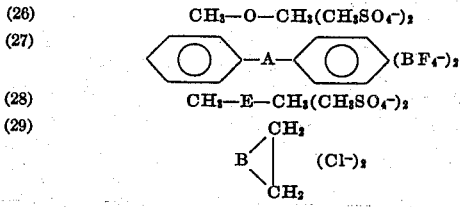
$⌬-A-⌬(BF_4^-)_2$
(28) $CH_3-E-CH_3(CH_3SO_4^-)_2$
(29) $B\begin{array}{c}CH_3\\ \\CH_3\end{array}(Cl^-)_2$ The colors obtained are mainly green to blue and purple, but other colors may be obtained, e.g. compound (26) gives a pink coloration.

The ease with which the tertiary nitrogen in ring systems quaternizes is advantageous in allowing the preparation of a wide range of radiation sensitive dicationic compounds. Thus radiation sensitive compounds may be made by the reaction of an organic compound containing a labile halogen with a compound containing two nitrogen atoms in linked, at least partially aromatic rings, at least one of the nitrogen atoms being unquaternized. Whether or not the halogen atom is sufficiently labile to undergo the quaternization reaction is best determined by small scale trail, e.g. with a bipyridyl as the nitrogeneous compound. Generally halogen atoms on an alkyl group will undergo the reaction, but halogen atoms directly bonded to an aromatic group will not unless suitable activated. The general principles of quaternization reactions are well known and will not be discussed here in greater detail.

The quaternization reactions are usually carried out in a moderately polar solvent such as methanol, ethanol, or acetonitrile. Co-solvents such as dioxan may be added to aid solution. The reaction may be promoted by heating for example under refluxing conditions, in a light-proof vessel. The atmosphere should be dry and may also be inert, e.g. nitrogen. Solvents may be removed subsequently or reduced in volume by evaporation and the product may be recovered by addition of a precipitating agent such as acetone or ether.

Aromatic groups containing halo-methyl side chains are very useful in forming radiation sensitive compounds containing dicationic nitrogen atoms. Using the bipyridyl molecule as an example, one molecule of a bipyridyl compound may be reacted with two molecules of an aromatic mono halomethyl compound to give a radiation sensitive compound of the type:

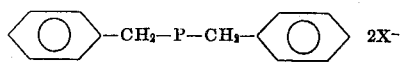

Alternatively one molecule of the aromatic mono halomethyl compound may be reacted with one molecule of a monoquaternized bipyridyl compound such as $$CH_3 - P X^-$$

The product of this reaction is:

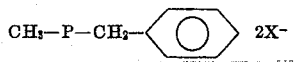

As examples of more complex radiation sensitive compounds, the following have been prepared:

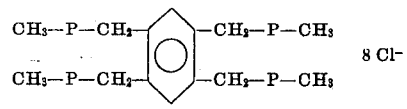

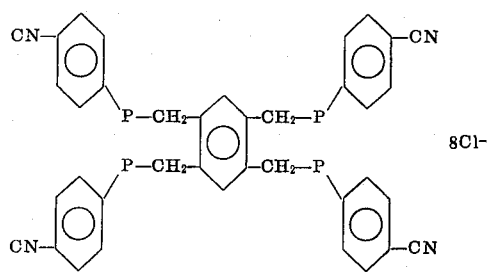

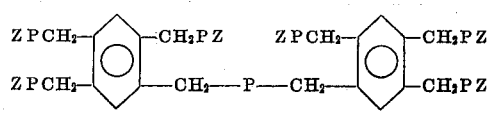

ere Z is

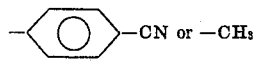

The cyanuric chloride molecule is also useful in the preparation of complex dicationic compounds. One, two or three molecules of a monoquaternized precursor of a dicationic compound may be reacted with cyanuric chloride. Further, one or two halogen atoms of the cyanuric chloride may be prequaternized with non-sensitive bases such as pyridine or quinoline or derivatives thereof. The remaining halogen atoms are then reacted with the mono-quaternized precursor of the sensitive dication compound. As examples, the following compounds have been prepared

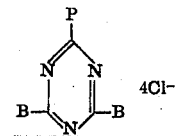

Where B = base, such as pyridine, quinoline, or a monoquaternized bipyridyl (M).

Polymers containing cationic units may also be prepared using difunctional or polyfunctional compounds according to the principles described above. These may be formable into films without additional film-forming agents, but better results are usually obtained by the additional use of water soluble polymers as will be described. Radiation sensitive cationic units may be incorporated in polymer chains by the quaternization of a bis(tertiary amine) precursor with a compound containing at least two halogen atoms, especially halogen compounds of the general formula $Cl—CH_2—Ar—CH_2—Cl$ where Ar is an aromatic nucleus. This reaction yields polymers in which dicationic group of the type shown in formula 1 is linked by a $—CH_2—Ar—CH_2—$ group. If the halogen compound contains more than two halogen atoms, cross-linked polymers are formed, whereas dihalogen compounds lead to the formation of linear-polymers. These latter are preferred since they more readily form aqueous solutions. It is possible to form linear polymers from compounds initially containing more than two halogen atoms if the halogen atoms in excess of two are first removed by pre-quaternization with a monofunctional amine, preferably a tertiary amine, such as pyridine, picoline or quinoline or a monoquaternized dication precursor. For example tetrahalomethyl aromatic compounds may be reacted with twice as many molecules of a monofunctional tertiary amine, to leave two unreacted halogen atoms which are then quaternized with a bipyridyl compound.

The conditions described above for quaternization reactions may be used for the preparation of these polymers, but more attention has to be paid to the selection of the solvent to keep the polymer in solution long enough to give a reasonable molecular weight. Co-solvents are advantageous used in conjunction with polar solvents, e.g. acetonitrile/methanol mixtures. Examples of polymers which may be prepared are the product of reacting 1,4-bis(chloromethyl)durene with bipyridyl;

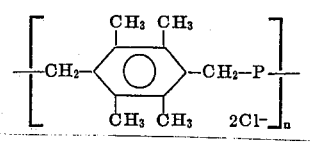

the product of reacting p-xylylene dichloride with 2,7-diazapyrene:

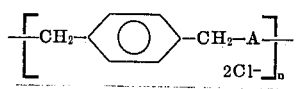

Other dihaloaromatic compounds which may be reacted with dication precursors are 1,5-dimethyl-2,4-bis(chloromethyl)benzene, 4,4'-bis-(chloromethyl)diphenyl ether, o-xylylene dibromide, 2,5-dimethoxy-p-xylene dichloride, 1,4-dimethyl-2,5-bis(chloromethyl)benzene. While the use of chloro compounds is preferred, bromo, or mixed chloro/bromo derivatives may also be used.

Certain multihalogen substituted compounds behave as dihalo compounds towards dication precursors and these do not need the excess of halogen atoms to be quaternized with a monofunctional tertiary amine, because all but two halogen atoms are insufficiently labile. These include 2,4,5,6-tetrachloro-1,3-bis(chloromethyl) benzene, 3,6-dichloro-2,5-dimethyl-1,4-bis(chloromethyl)benzene, and 2,5-dichloro-p-xylene dichloride. Halogen atoms directly bonded to aromatic groups are not usually labile unless activated by, for example, nitro groups, Halogen compounds containing more than two halogen atoms which, in order to form linear polymers, require halogen atoms in excess of two to be removed by pre-quaternization include 1,2,4,5-tetra(chloromethyl)benzene and 1,4-dichloro-2,3,5,6-tetra(chloromethyl)benzene (only two chloromethyl halogen atoms need be removed). Pre-quaternization with a tertiary amine such as pyridine or quinoline is suitable.

Cyanuric chloride pre-reacted with one molecule of a tertiary amine is capable of forming linear polymers with ditertiary diamine dication precursors by quaternization. An example of such a polymer is:

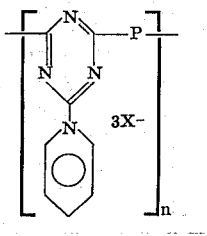

B. Anions

The anions associated with the cations to form the radiation sensitive salt may be inorganic or organic, but are preferably derived from strong acids having a pKa value less than 2.5.

The anions should not be oxidizing or reducing agents or otherwise chemically reactive with solvents, and other materials used in the preparation of the films. To avoid quenching the excited state of the salt, elements of high atomic weight, e.g. iodine, should be avoided. They should not be colored nor is it desirable that they confer insolubility in water.

Suitable anions are chloride, methyl sulphate, perchlorate or bisulphate.

Also suitable are fluoroborate ($BF_4^-$), aromatic sulphonates such as naphthalene sulphonate, and silicofluoride ($siF_6^=$). The last mentioned has the property of fluorescence under ultraviolet radiation. Therefore when incorporated into a film in conjunction with a dicationic compound the resultant film may be used for the simultaneous observation and recording of ultraviolet radiation.

Polymeric anions may be also used.

Zwitterionic compounds are also effective; for example

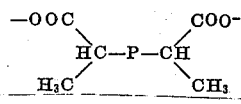

gives a green color in a poly(vinyl alcohol) film.

C. Film-forming polymers

As already mentioned, certain salts, are radiation sensitive and film-forming without additional materials, but it is most convenient, and in fact best results are often obtained by using the salt in association with one or more additional water soluble film-forming polymer matrices.

Films may be prepared by dissolving the matrix material and the salt (monomer or polymer) in aqueous solvent, preferably water itself, forming a thin layer of the solution and evaporating off the water and solvent. For experimental purposed it is convenient to pour a solution of the materials onto a clean glass surface, slowly evaporate the water off and then strip the product film from the glass. On a larger scale, films may be cast continuously.

The solution containing matrix and salt may be used to impregnate a porous sheet material such as paper or cloth to produce an alternative form of radiation sensitive material.

Self supporting films may be prepared from water soluble polymers, conveniently about 0.2 to 2 mm thick. Preferably however, the film is prepared as a coating on a flexible base, such as polyethylene terephthalate film, when the coating thickness can be reduced to 0.001 to 0.1 mm.

Water-soluble polymers suitable for use as the matrix material include poly(vinyl alcohol), poly(ammonium methacrylate), gelatin, aliginates, and maleic anhydride copolymers e.g. with styrene vinyl ether, or ethylene.

Soluble polysaccharides such as polysucrose may also be used. Polyvinylpyrrolidone is also useful, and good results have been obtained with mixtures of film-forming polymers, especially with mixtures of poly(vinyl alcohol) with poly(vinylpyrrolidone), using 40–80 percent of the latter.

The proportions of salt and film-forming polymer used are not particularly critical, being dictated mainly by practical considerations and sensitivity required. Typically a solution for film casting consists of water soluble polymer 5–20 parts, salt conferring radiation sensitivity whether it is simple or polymeric, 0.1 to 10 parts, and water to 100 parts. All parts herein are by weight. Storage and handling must obviously be in the absence of radiation to which the materials are sensitive.

While water soluble polymers are preferred certain water insoluble polymers may be used if dissolved in a suitable solvent. An example is a copolymer of 1,6-diaminotrimethyl hexanes and terephthalic acid which may be cast into films using a polar solvent such as dimethyl formamide and the appropriate salt.

D. Additives

1. For Speed Improvement

The addition of compounds containing active hydrogen as in alcohols and amines has been found to improve the speed of the film. Such compounds include alcohols, phenols, carboxylic acids, and sugars. Examples are glucose, oxalic acid, p-chlorobenzoic acids, glycerol, phenol, ethylene diaminetetraasetic acid (disodium salt), picric acid, mellitic acid, triethanolamine, thiamine, and nicotinamide adenosine dinucleotide phosphate. The amount of additive used depends upon the amount of radiation sensitive salt used. Conveniently, for each part by weight of salt 0.1 part to 1 of one or more additives should be used.

2. Sensitizers and Desensitizers

The term "sensitize" is used herein to denote a modification of the spectral response of the film in such a way that it becomes sensitive, in the presence of the sensitizer, to a part of the spectrum to which is was previously insensitive. Many of the films based on the salts hitherto described, show very little response to light of wavelengths longer than 405 nm. However, with the addition of certain sensitizers, the response may be extended well into the visible region of the spectrum. Riboflavin, as free base, Acronol yellow (a dyestuff comprising 3,6-dimethyl-2-(4-dimethylaminophenyl)benzthiazolium chloride) and alkaline solutions of the wood resin derivative known as collophony, are capable of extending the sensitivity up to or beyond 500 nm. Other sensitizers include 3,3′ diethylthiacyanide iodide, proflavin, acridine orange, acriflavin, N-methylphenazinium methyl sulphate, 4-cyanoquinolinium methiodide and erythrosin. Mixtures of sensitizers may be used.

Desensitizers, which may be added to reduce the spectral response, so that the film may be handled in daylight, include p-aminobenzoic acid, 6-amino-3,4-phthaloylacridone, urazole and "Lissapol N." The presence of the $SiF_6^=$ anion also has a desensitizing effect, in that the response of a film for containing this anion is lower at wavelengths above 350 nm.

Suitable amounts of sensitizer or desensitizer are 5–100 parts per 1,000 parts of dicationic compound, except in the case of collophony where the sensitization is believed to be due to a normally present impurity, larger amounts are therefore required.

3. Miscellaneous

Various other additives may be incorporated in the solution to modify the radiation sensitivity or physical properties of the finished material. For example, ammonium chloride improves the sensitivity to light and also film pliability, and other water soluble plasticizers, such as urea, glycerol and other polyols, may also be used to improve this property. Sensitivity to X-rays may be increased by the introduction of a compound of metal of high atomic weight, such as barium chloride.

After exposure, the film may be protected from further effect of radiation to which it is sensitive by applying a coating of a suitable filter. Thus for films which are ultraviolet sensitive a coating containing aromatic groups may be used, e.g. a poly(ethylene terephthalate) film.

E. Film Properties

The films prepared according to our invention are preferably clear, being colorless or only slightly colored, typically a pale yellow. Exposure to sunlight, unless desensitizers or filters are included causes a coloration to develop. Films cast from water soluble polymers are generally sensitive to water, becoming tacky or swelling in high humidity conditions. Precautions appropriate to the polymer used should be taken, which usually involves storage in a dry atmosphere.

Films prepared from water soluble polymer and salt only without added sensitizers are usually sensitive to wavelengths below 366 nm, sometimes only below 313 nm. Examples of the last type are salts including the fluorosilicate anion, films including this anion may be handled in sunlight, which is low in radiation below 320 nm.

The film is sensitive over a wide range of pH, the useful range being about 2–10.

Several dicationic compounds have been observed to give different colored images with different wavelengths of irradiation. This phenomenon is referred to as "photopolychromism."

This $CH_2$—P—$CH_3$. $2Cl^-$ gives blue images at 366 nm and purple images at 313 nm. The polymer containing the unit

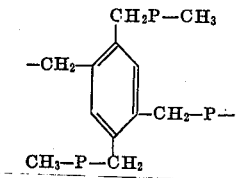

is phototetrachromic, giving images which are turquoise at 436 nm, blue at 366 nm, purple at 334 nm and red at 313 and 254 nm.

Electron sensitivity of $CH_3$—P—$CH_3$—$2Cl^-$ is a maximum at about 70 KV energy (film 0.4 mm thick).

The resolving power of the film is extremely high, being better than >1,200 lines/mm.

Image stability depends on factors such as relative humidity, low values favoring more permanent images. It is advantageous to coat exposed film with a U.V. absorbing material and/or a water impermeable material.

F. Examples

The following Examples illustrate the invention. Parts are by weight. Analytical data refers to the radiation sensitive salts not the completed films containing them.

Salts were screened for radiation sensitivity using a standard procedure which was as follows. An aqueous solution 10 percent in polyvinyl alcohol and 1 percent in salt to be tested is cast onto a glass plate and allowed to dry overnight. The resultant film is peeled off and stored in a desiccator. Small portions of the film are inserted into the cell compartment of a Farrand spectrophotofluorimeter fitted with a medium pressure 150 watt quartz mercury lamp. The exciting monochromator is set to the required mercury line with interposition of appropriate filters between the lamp and the monochromator to produce a suitable working intensity. Coloration of the film is followed as a function of time by placing a filter combination after the film and allowing the transmitted light to impinge on a photomultiplier. The filter combination is chosen to transmit light corresponding to a peak in the visible absorption spectrum of the radical so that a direct measure of radical color formation can be accomplished at the same time as irradiation, utilizing the stray light from the analyzing beam. In order to compare different films the conditions of irradiation were kept constant and the time taken for transmission to drop by 25 percent measured. This time is used as a quantitative measure of film speed. Since transmission of light is the measured variable, the method differs from conventional film speed determinations which rely on light absorption rather than transmission.

The wavelengths chosen for film speed determinations correspond to the major wavelengths of the mercury arc: 576 nm, 546 nm, 436 nm, 405 nm, 366 nm and 254 nm. Table 2 shows speeds measured by the method described above, for various salts described in the Examples and earlier in the specification, in polyvinyl alcohol film.

EXAMPLE 1

Poly(vinyl alcohol) (15 parts) was dissolved in water (made up to 100 parts) at 80° C, and N,N'-dimethyl-4,4'-bipyridilium dichloride (3 parts) was dissolved after the solution had cooled to 40° C.

The solution was poured onto a clean glass surface under dark-room conditions and the water was allowed to evaporate slowly at 20° C. When dry, the film was stripped from the glass and was stored away from daylight.

The film was then exposed to ultraviolet light of a wavelength of 366 nm, when a blue coloration was induced. A similar effect was observed on exposure to X-rays and electrons by means of an electron beam microscope. The image does not fade when kept in a dry atmosphere, and exhibits resolution at least as high as a conventional silver emulsion.

EXAMPLE 2

The procedure of Example 1 was repeated, substituting poly(ammonium methacrylate) (15 parts) for the poly(vinyl alcohol). After preparing the film it was exposed to ultraviolet radiation of 366 nm wavelength, and a similar blue coloration was noted. A sample of this film gave good light transmission in the region of 436 nm compared with the transmission at 405 nm. The film is therefore of use in photochemical systems where it is desired to isolate the 436 nm line of mercury lamp radiation for photochemical purposes.

EXAMPLE 3

The procedure of Example 1 was repeated substituting gelatin (15 parts) for poly(vinyl alcohol). Similar coloration was obtained on exposure to ultraviolet radiation, though the images were less stable than those obtained by methods described in Examples 1 and 2.

EXAMPLE 4

Bipyridyl (174 parts) was reacted with p-xylene dichloride (197 parts) in methanol (1,300 parts) at 64° C. The reactants were heated under reflux conditions under an atmosphere of nitrogen in a light-proofed flask whilst stirred for 24 hours. The white paste obtained was diluted with methanol (2,500 parts) and ether (2,500 parts) was added to coagulate the product. This was then separated from liquors by filtration, washed with ether (3 × 500 parts) and then dried, first by suction until damp dry and then under vacuum, for 2 hours at 10 mm Hg pressure and finally at 0.05 mm Hg pressure for 20 hours at room temperature over phosphorous pentoxide in light-proofed apparatus. The product polymer (367 parts) is consistent with repeating units of the structure

3 parts of this polymer and poly(vinyl alcohol) (15 parts) were dissolved in water and a film was cast using the technique described above. On irradiation with ultraviolet light (366 nm) a blue-purple coloration was obtained.

Elemental Analysis
Calculated for $C_{18}H_{16}N_2Cl_2$:
C, 65.25; H, 4.83; N, 8.46; Cl, 21.46%
Found:-
C, 64.57; H, 5.88; N, 8.06; Cl, 19.53%
Infra-Red Spectrum (2% in KBr disc) 19.53%
Main band at 3080 cm$^{-1}$ (aromatic), 2980 cm$^{-1}$, 1635 cm$^{-1}$ (C=N), 1560, 1505, 1450 cm$^{-1}$ (aromatic), 1435 and 1350 cm$^{-1}$, ($-CH_2-$), 1230-1210 cm$^{-1}$ (C=C), 1160 cm$^{-1}$ (C—N $^+$) A broad band at 3350 cm$^{-1}$ was present due to hydroxyl from water, since the polymer is very hygroscopic.

UV Spectrum (in water, 1 cm. cell, $10^{116}\ ^5$M solution) $\lambda_{max.}$ at 201 nm and 261 nm having extinction coefficients
45,000 and 38,000 respectively.

| NMR Spectrum (220 Mc/s H' nmr in $D_2O$) | Integral |
|---|---|
| 0.68τ doublet:ortho proton to N$^+$ | 4 |
| 1.3τ doublet:meta proton to N$^+$ | 4 |
| 2.28τsinglet:4 protons in ring | 4 |
| 3.88τsinglet:singlet—CH$_2$ next to N$^+$ | 2 |

Integral values are in agreement with the above formula.

The solid is a pale yellow amorphous powder, soluble in water, slightly soluble in hot ethanol and methanol but insoluble in acetone, ether and non-polar solvents. The dry solid is very hygroscopic and is light sensitive when exposed to bright sunlight, more so in the presence of an inert atmosphere.

EXAMPLE 5

The procedure of Example 4 was repeated using poly(ammonium-methacrylate) (15 parts). A similar blue-purple coloration was obtained on irradiation.

EXAMPLE 6 p-Cyanoaniline (47 parts) was refluxed with N,N'-di(2,4-dinitrophenyl) 4,4'-bipyridilium dichloride (56 parts) in ethanol/pyridine (500 parts and 200 parts respectively). The product was a compound having the structure:

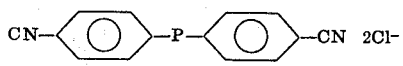

3 parts of this material were made up into a film with poly(vinyl alcohol) using the procedure of Example 1. On exposure to ultraviolet light, a green coloration formed.

EXAMPLES 7–9

The procedure of Example 1 was repeated using the same bipyridilium dication in conjunction with other anions as follows:
Example 7 – methyl sulphate
Example 8 – perchlorate
Example 9 – bisulphate
On exposure to ultraviolet radiation of a wavelength of 366 nm, a similar blue coloration was observed.

EXAMPLES 10 and 11

Films were prepared by the procedure of Example 1 using, for Example 10, 0.5 parts of ammonium chloride, and for Example 11, 0.5 parts of glycerol, in addition to the other components. In both cases, the film exhibited improved pliability. Sensitivity to ultraviolet radiation was similar to that achieved in Example 1.

EXAMPLE 12

A film was prepared by the procedure of Example 1, with in addition, 0.25 parts barium chloride. The prepared film exhibited increased sensitivity to X-rays in comparative tests.

EXAMPLE 13

1,4-Bis(chloromethyl)durene (462 parts) was refluxed in ethanol (4000 parts) containing 4,4'bipyridyl (312 parts). The reaction was carried out under a nitrogen atmosphere in a lightproof flask. The product was filtered off, washed and dried as described in Example 4. The polymer was obtained in 95 percent yield. Analysis (data given below) is consistent with repeating units of the structure

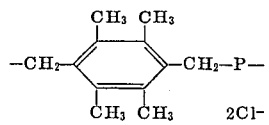

3 parts of this polymer and poly(vinyl alcohol) (15 parts) were dissolved in water and cast into film. On exposure to ultraviolet light of 313 nm a dark blue coloration was obtained.
Elemental Analysis
  Calculated for $C_{22}H_{24}N_2Cl_2$:-
    C, 68.21; H, 6.20; N, 7.23; Cl, 18.34%
  Found:-
    C, 66.57; H, 6.65; N, 7.82; Cl, 18.02%
Infra-Red Spectrum (2% in KBr disc)
  Band at 3250 cm$^{-1}$ indicative of presence of —OH probably from $H_2O$ since the compound is very hygroscopic. Band at 1625 cm$^{-1}$ (C=N). Bands in 1500-1300 cm$^{-1}$ region are aromatic and —CH$_2$; 1150 cm$^{-1}$ (C-N$^+$) and at 820 cm$^{-1}$ (hexa substituted benzene). Very weak band at 710 cm$^{-1}$ suggests presence of very small amounts —C—Cl. this would agree with the analysis in that high nitrogen and hydrogen content would suggest predominantly bipyridyl end groups.

UV Spectrum (in water, 1 cm. cell 10$^{-5}$M solution)
  Absorption in UV only $\lambda_{max}$.261 and 204 nm having extinction coefficients of 49,500 and 82,000 respectively.

| NMR Spectrum (60 Mc/s H' nmr in $D_2O$) | Integral |
|---|---|
| 1.00–1.09τ doublets:ortho protons to N$^+$ | 4 |
| 1.50–1.59τ doublets:meta protons to N$^+$ | 4 |
| 3.82τ singlet:—CH$_2$— next to N$^+$ | 4 |
| 7.84τ singlet:—CH$_3$— proton | 12 |

The integrals are in good agreements with proposed structure.
No aromatic (benzene) protons were detected.
The solid is pale lemon amorphous powder, hygroscopic and easily soluble in water, slightly soluble in boiling methanol and ethanol but insoluble in all nonpolar solvents e.g. ether and acetone. On heating the polymer does not melt below 320° C. and becomes green above 120° C. then deep yellow at ≅ 180° C. and finally turns dark brown c.a. 245° C. The solid rapidly becomes blue in bright sunlight but loses color on storage in dark.

EXAMPLE 14

The procedure of Example 13 was repeated using p-xylylene dichloride (350 parts) and 2,2'-bipyridyl (312 parts). A polymer was obtained in 90 percent yield in which the repeating units as indicated by analytical data given below were of the structure:

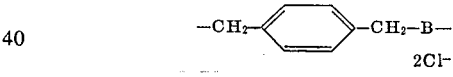

A poly(vinyl alcohol) film containing this polymer rapidly turned blue on exposure to sunlight.
Elemental Analysis
  Calculated for $C_{18}H_{16}N_2Cl_2$:-
    C, 65.25; H, 4.83; N, 8.46; Cl, 21.46%
  Found:-
    C, 62.58; H, 5.36; N, 7.97; Cl, 21.22%
Infra-Red Spectrum (2% in KBr disc)
  Bands at 3000 1$^{-1}$, , 1635 cm$^{-1}$ (C=N), 1555, 1505, 1450, 1430, 1355 cm$^{-1}$ (—CH$_2$— aromatic) 1225 cm$^{-1}$ (C=C), 1165 (C-N$^+$). Bands at 830, 805 and 775 cm$^{-1}$ characteristic of p-disubstituted benzene.
UV Spectrum (in water, 1 cm. cell 10$^{-5}$ M solution)
  $\lambda_{max}$. 202 nm and 261 nm having extinction coefficients 50,300 and 45,200 respectively.

The product is a white amorphous powder, very hygroscopic and becomes a blue-green on exposure to sunlight. A specimen retains the blue-green coloration if exposed to sunlight in a dry inert atmosphere or under $N_2$ in a sealed ampoule, even when stored in dark. Exposed to moist air, the blue-green coloration is quickly replaced by an orange-red color.

EXAMPLE 15

The procedure of Example 13 was repeated using, 1,5-dimethyl-2,4-bis(dichloromethyl)benzene (404 parts) and 4,4'-bipyridyl (312 parts). Polymer was obtained in 64 percent. Analytical data (given below) indicates the following structure:

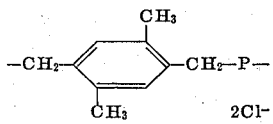

In a poly(vinyl alcohol) film is exhibited sensitivity to light of wavelength 405 nm, 266 nm, 313 nm and 254 nm.

Elemental Analysis
Calculated for $C_{20}H_{20}N_2Cl_2$:-
C, 66.84; H, 5.57; N, 7.81; Cl, 19.78%
Found:-
C, 62.62; H, 6.31; N, 7.25; Cl, 18.89%

Infra-Red Spectrum (2% in KBr disc)
Main bands at 3350 cm$^{-1}$ (OH in water), 2970 cm$^{-1}$ to 2500 cm$^{-1}$ (—CH$_3$), 1635 cm$^{-1}$ (C=N), 1560, 1560, 1505, 1450 cm$^{-1}$ (aromatic), 1160 (C—$\overset{+}{N}\equiv$). Broad at 820 cm$^{-1}$ tetra substituted benzene.

The solid is a pale yellow amorphous powder which, on heating did not melt below 330° C. but darkened in color above 250° C. at which temperature sintering and some decomposition occurs. The residual solid is very dark brown in color. The solid is very hygroscopic and easily soluble in water. It is slightly soluble in boiling ethanol and methanol, but insoluble in acetone, ether and non-polar solvents. It is light sensitive, and when in a dry inert atmosphere becomes an intense blue color in direct sunlight. This blue color is retained in the dark under dry conditions and inert atmosphere but is lost on exposure to air.

EXAMPLE 16

The procedure of Example 11 was repeated using orthoxylylene dibromide (528 parts) instead of the para-dichloride. Under identical conditions a polymer was prepared in 85 percent yield. A film was made up using poly(vinyl alcohol). On exposure to light of 366 nm wavelength a turquoise color was obtained while at 254 nm a red color resulted.

Elemental Analysis
Calculated for $C_{18}H_{16}N_2Br_2$:-
C, 51.45; H, 3.81; N, 6.67; Br, 38.10%
Found:-
C, 48.62; H, 4.14; N, 7.02; Br, 39.43%
Ionic Br = 33.00%
Analysis would seen to indicate a preponderance of end-groups containing covalent bromine.

Infra-Red Spectrum (2% in KBr disc)
The characteristic bands of the suggested structure are present:- 1635 cm$^{-1}$ (C=N), 1560, 1505, 1450 cm$^{-1}$ (aromatic), 1350 cm$^{-1}$ broad band (—CH$_2$—), 1230-1200 cm$^{-1}$ (—C=C—), 1160 cm$^{-1}$ (C—N$^+$). Bands in region 840–760 cm$^{-1}$ characteristic of the ortho disubstituted benzene nucleus.

UV Spectrum (in water, 1 cm. cell $2 \times 10^{-4}$M solution)
$\lambda_{max}$. 202 and 262 nm having extinction coefficients 34,600 and 22,400 respectively.

NMR Spectrum (60 Mc/s H' nmr in D$_2$O)  Integrals

| | |
|---|---|
| 0.63–0.74τ doublet: proton ortho to N$^+$ | 4 (4) |
| 2.15–2.26τ doublet: proton meta to N$^+$ | 4 (4) |
| 2.28τ ⎫ aromatic protons | 4 (4) |
| 2.42τ ⎭ | |

Integrals in brackets are theoretical values for the above structure.

The solid is a bright yellow hygroscopic amorphous polymer which did not appear to be sensitive to direct sunlight but responded to UV (360 nm) slowly to produce a purple-blue color. It decolorized quickly in air i.e. return to yellow color. On heating the color gradually darkens and at 240°–245° C., sintering occurs; by 260° C. the solid appears black; decomposition and melting occurs in range 268°–270° C.

EXAMPLE 17

1,2,4,5-tetra(chloromethyl)benzene (544 parts) was dissolved in a mixture of ethanol (4,000 parts) and dioxane (900 parts). The solution was heated to reflux in a light proof flask under an atmosphere of nitrogen. Two molar equivalents of pyridine (316 parts) in ethanol (900 parts) was added and heating continued for 3 hours. Then 1 molar equivalent of 4,4'-bipyridyl (312 parts) in ethanol (1,350 parts) was introduced and heating continued for a further three hours.

After cooling, solvents were removed by evaporation under vacuum and the solid was dried at 0.01 mm Hg pressure at room temperature. The product (1,117 parts, 100 percent yield) was an amorphous polymeric solid. The following analytical data (given below) is consistent with a structure:

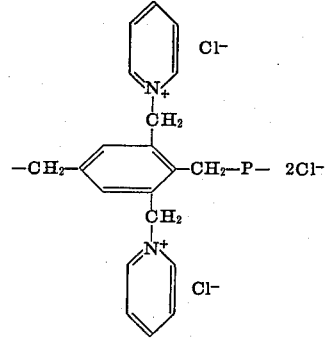

3 parts of this material in poly(vinyl alcohol) (15 parts) made a film which was photodichromic in that is sensitive to light of wavelength 366 nm (blue colored image) 254 nm (purple-red colored image) and 313 nm (intermediate color).

Elemental Analysis
Calculated for $C_{30}H_{20}N_4Cl_4$:-
C, 61.43; H, 4.79; N, 9.56; Cl, 24.23%
Found:-
C, 59.75; H, 5.56; N, 8.28; Cl, 21.43%
Ionic chlorine Cl = 20.74%
Analysis suggests that some water is present in sample.
Sample is extremely hygroscopic i.e. exposure to atmosphere for even a short period produces a gummy solid and finally an aqueous solution of polymer.

Infra-Red Spectrum (2% in KBr disc)

The main bands are characteristic of polymer having the proposed structure 2970 cm$^{-1}$, 1635 cm$^{-1}$ (C=N), 1560–1360 cm$^{-1}$ (aromatic), 1230–1200 cm$^{-1}$ (C=C), 1160 (C—N$^+$). Bands in region 880–770 cm$^{-1}$ characteristic of tetrasubstituted benzene.
UV Spectrum (in water, 1 cm. cell, 1.5 × 10$^{-4}$ M solution)

$\lambda_{max}$. 206 and 260 nm having extinction coefficients (approx.) 29,100 and 18,300 respectively.

The solid is a fawn colored amorphous powder which may be cast from water to form a film which develops a deep blue-green color in sunlight, particularly in dry inert atmosphere. On heating, the solid darkens in color above 180° C. and decomposes with melting at 212°–213° C. It is insoluble in non-polar solvents, e.g. acetone and ether.

EXAMPLE 18

The procedure of Example 17 was repeated using quinoline (516 parts) instead of pyridine. Similar results were achieved though the film was tested for sensitivity at 313 and 254 nm only.

Analytical data (given below) is consistent with repeating units having the structure as in Example 17, but with quinoline groups replacing the pyridine side groups.
Elemental Analysis
  Calculated for $C_{38}H_{32}N_4Cl_4$:-
    C, 66.48; H, 4.66; N, 8.16; Cl, 20.80%
  Found:-
    C, 64.25; H, 5.12; N, 9.14; Cl, 18.69%
It would appear from analysis that water is present.
Infra-Red Spectrum (2% in KBr disc)

Main bands characteristic of a compound possessing the proposed structure (Water is adsorbed very quickly by disc during running of spectrum) 1635 cm$^{-1}$ (C=N), 1600–1370 cm$^{-1}$ (aromatic and —CH$_3$—) 1230 cm$^{-1}$ (C=C), 1160 cm$^{-1}$ (C—N$^+$). Broad band at 820 cm$^{-1}$ suggests tetra substituted benzene.
UV Spectrum (in water, 1 cm. cell 10$^{-5}$M solution)

$\lambda_{max}$. 204, 229, 236(1), 264, 312 nm. Extinction coefficients are 132,000 87,000, 67,000, 52,000 and 19,000 respectively.

The product is a deep red-brown colored amorphous solid, which, in a dry inert atmosphere becomes deep blue on exposure to sunlight. It is extremely hygroscopic - easily soluble in water and in ethanol/dioxane from which films may be cast. The solutions are unstable in air and the deep red solution formed in either ethanol/dioxane or in water rapidly changes to dark green color and eventually becomes dark brown. The solid is insoluble in non-polar solvents, e.g. acetone, ether etc.

On heating the color gradually darkens to black and decomposition and melting occurs at about 215° C.

EXAMPLE 19

A film was cast from an aqueous solution containing by weight 10 percent poly(vinyl alcohol), 1 percent poly(p-xylyl-4,4'-bipyridylium dichloride) and 0.1 percent riboflavin hydrochloride. This film is sensitive to wavelengths of 436 nm and 500 nm.

EXAMPLE 20

A film was cast from an aqueous solution containing by weight 5 percent poly(vinyl alcohol), 5 percent collophony and 0.1 percent sodium hydroxide and 1 percent poly(2,3,5,6-tetramethyl-p-xylyl-4,4'-bipyridylium dichloride). This film is sensitive to wavelengths of 436 nm and 500 nm.

EXAMPLE 21

A film made as in Example 19 above but with the addition of 0.5 percent Nicotinamide adenine dinucleotide phosphate showed a faster response speed than in Example 19 over the range of wavelengths 400–500 nm. The response was improved by a factor of about 2.5 times.

EXAMPLE 22

A film made by casting an aqueous solution containing by weight 5 percent polyvinylpyrrolidone, 5 percent poly(vinl alcohol), 1 percent bicyanophenyl 4,4'-bipyrylium dichloride, 0.5 percent glucose, 0.1 percent riboflavin hydrochloride and 0.1 percent 3,3'-diethylthiacyanine iodide responded to wavelengths up to 550 nm. Mixtures of polyvinylpyrrolidone and poly(vinyl alcohol) were found to form a film of higher light sensitivity than either polymer alone.

EXAMPLE 23

Example 19 was repeated with the addition of 0.1 percent "Lissopol N." This film is desensitized to ultraviolet light but its sensitivity towards electron beams is unaffected.

EXAMPLE 24

A film made by casting an aqueous solution containing by weight 10 percent poly(vinyl alcohol) and 0.5 percent N,N'dimethyl-4,4'-bis-pyridilium dichloride silicofluoride was sensitive to radiation of 313 nm wavelength, but not to radiation of 366 nm wavelength, whereas in the presence of other anions a similar film exhibits sensitivity at the latter wavelength.

EXAMPLE 25

A film was cast from a solution containing 10 percent poly(vinyl alcohol) 1 percent N,N'-bisphenyl-2,7-diazapyrinium difluoroborate, 0.2 percent ammonium chloride, 0.5 percent glucose. The film responded to light of wavelength up to at least 436 nm.

EXAMPLE 26

A film was cast following the procedure of Example 25 using 1.2-bis(1'-methyl - 4'-pyridinium )ethylene di(methyl sulphate 0). It turned magenta in sunlight.

EXAMPLE 27

1,2-Bis(4'-pyridinium)ethylene (30 parts) and p-xylylene dichloride (29 parts) dissolved in ethanol (500 parts) were placed in light-proof flask and the mixture was heated to reflux under an atmosphere of nitrogen for ≅ 2 hours. The cooled reaction mixture contained precipitated products in the form of an almost white amorphous solid. The slurry was poured into anhydrous ether (200 parts) and washed with ethanol (150 parts).

The precipitate obtained was removed by filtration washed with ether (3 × 250 parts) and then dried under vacuum over $P_2O_5$ at room temperature for 20 hours. A pale fawn-pink colored solid was obtained. Yield: 49 parts. Percent yield 82.4 percent, m.p. >310° C. Analysis is consistent with a polymer containing the units:

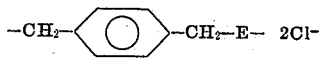

Analysis calculated for $C_{20}H_{18}N_2Cl_2$:-
C, 67.25; H, 5.05; N, 7.85; Cl, 19.85%
C, 62.16; H, 5.60; N, 6.87; Cl, 18.6%
Found:-

EXAMPLE 28

Table 1 illustrates the effect of various sensitizers. The film is the standard mixture based on poly(vinyl alcohol), and $CH_3$—P—$CH_3$—$2Cl^-$ to which the sensitizer is added.

DET = diethylthiacyanine (5 parts/100 parts salt)
RIBO = riboflavin (5 parts/100 parts salt)
GLUC = glucose (50 parts/100 parts salt)

TABLE 1

| Film Constitution | Film Speed (secs.) | | |
|---|---|---|---|
| | 500 nm | 436 nm | 405 nm |
| PVA | I | I | 100 |
| PVA/GLUC | I | I | 79 |
| PVA/DET | I | >200 | 60 |
| PVA/RIBO | I | 8.5 | 12 |
| PVA/RIBO/GLUC | I | 5 | 7 |
| PVA/RIBO/GLUC/DET | >100 | 8 | nt |

I = insensitive
nt = not tested

It will be seen that at a given wavelength the addition of glucose only improves the response of the film.

EXAMPLES 29 to 40

Films were made up using the standard procedure and the speed of image formation at various wavelengths was measured using the standard method indicated earlier.

The sensitive salt is named in column 2 of Table 2 using the nomenclature described earlier.

In column 3 is given a reference to earlier examples describing the preparation or to the general description in section A of the specification, indicated by the letter A in this column. Some materials are mentioned for the first time.

In column 4 there is indicated the color of the image in the film and in columns 5-9, the speed of image formation at indicated wavelengths. I = insensitive.

TABLE 2

| Ex. No. | Salt | Reference | Film colour | Speed of image formation (secs.) | | | | |
|---|---|---|---|---|---|---|---|---|
| | | | | 435 nm. | 405 nm. | 366 nm. | 313 nm. | 256 nm. |
| 29 | NC—⟨○⟩—P—⟨○⟩—CN | 6 | Green | 96 | 33 | 5.5 | 7 | 6 |
| 30 | Polymer —CH₂—⟨○⟩—CH₂—P— $2Cl^-$ | 4 | Blue | I | 100 | 12 | 47 | 27 |
| 31 | Polymer —CH₂—⟨○⟩—CH₂—P— CH₃ CH₂ $2Cl^-$ | 15 | ...do... | I | I | 15 | 28 | 66 |
| 32 | Polymer —CH₂—⟨○⟩—O—⟨○⟩—CH₂—P— $2Cl^-$ | | ...do... | I | I | I | 61 | 168 |
| 33 | Polymer —CH₂ CH₂—P— ⟨○⟩ $Br_2^-$ | | Blue (313) Red (254) | I | I | I | 94 | 84 |
| 34 | Polymer (pyrimidinyl structure with N⁺Cl, P—, $2Cl^-$) | A | Blue | I | I | I | 18 | 50 |

Table — Continued

| Ex. No. | Salt | Reference | Film colour | Speed of image formation (secs.) | | | | |
|---|---|---|---|---|---|---|---|---|
| | | | | 435 nm. | 405 nm. | 366 nm. | 313 nm. | 256 nm. |
| 35 | Polymer 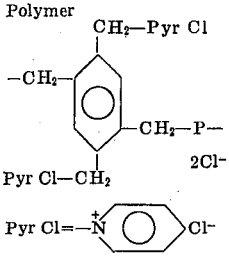 | 17 | {Blue (366), Red (254)} | I | I | 51 | 27 | 69 |
| 36 | Polymer 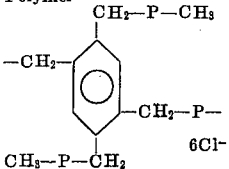 | A | {Turquoise (436), Blue (366), Purple (334), Red (313, 254)} | 15 | 63 | 20 | 9 | 30 |
| 37 | —CH₂—⌬—CH₂—B— 2Cl⁻ | 14 | {Blue, Red} | I | I | 43 | 17 | 46 |
| 38 | CH₃—P—CH₃ 2Cl⁻ | 14 | {Blue, Red} | I | I | 43 | 17 | 46 |
| 39 | HOCH₂CH₂—P—CH₂—CH₂OH 2Cl⁻ | A | Blue | I | I | 89 | 14 | 54 |
| 40 | 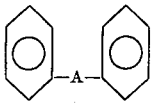 2BR₄⁻ | 25 | Blue/purple | 200 | 20 | 11 | 22 | 79 |

What we claim is:

1. A N,N'-bis (p-cyanophenyl) bipyridilium salt of a strong acid having a pKa value less than 2.5 which is not chemically reactive towards aqueous media.

2. N,N'-bis (p-cyanophenyl) bipyridilium chloride.

* * * * *